United States Patent Office 3,359,969
Patented Dec. 26, 1967

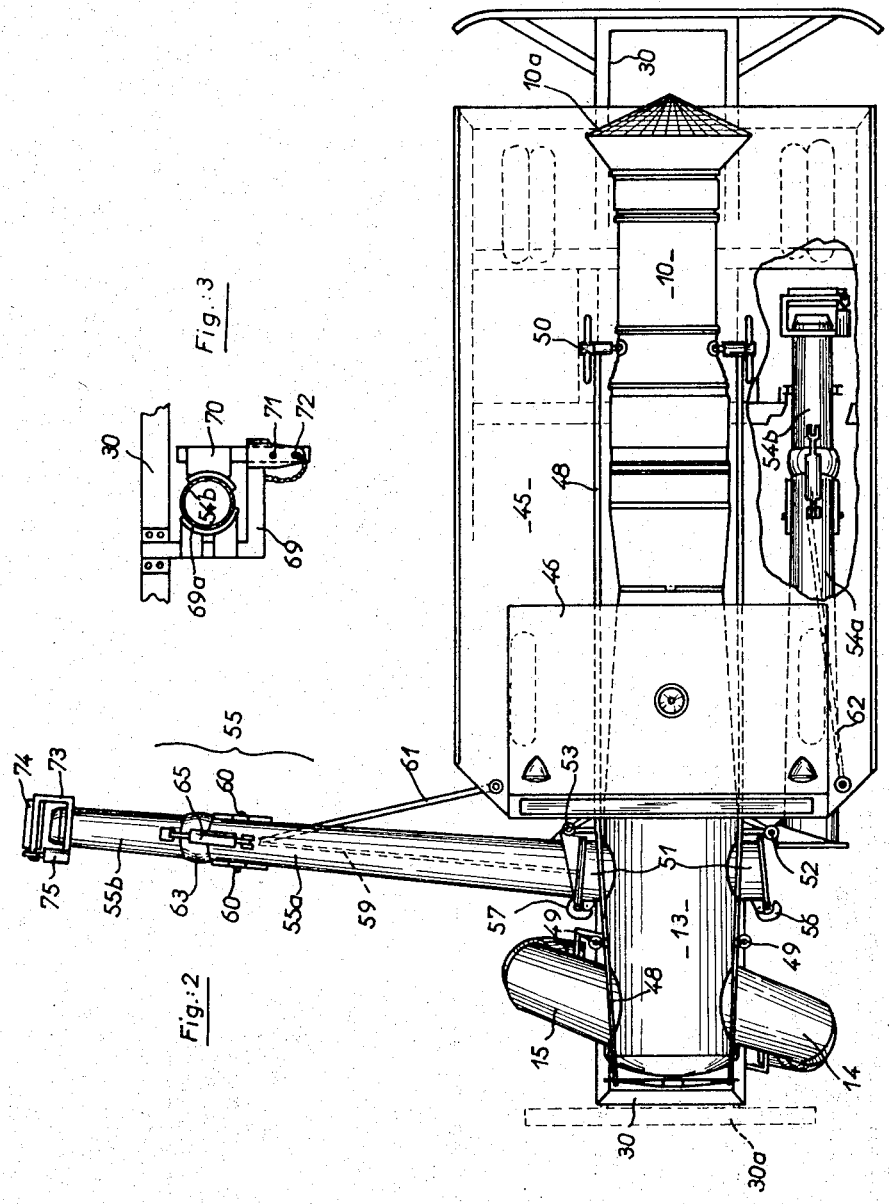

3,359,969
DEVICE FOR CLEARING WIDE SNOW- OR ICE-COVERED RUNWAYS, ROADS OR THE LIKE
Jean Henri Bertin, Neuilly-sur-Seine, and Ernest Dubois, Fontenay-aux-Roses, France, assignors to Bertin & Cie, Paris, France, a company of France
Original application Oct. 20, 1965, Ser. No. 498,453, now Patent No. 3,308,806, dated Mar. 14, 1967. Divided and this application Jan. 9, 1967, Ser. No. 608,098
Claims priority, application France, Jan. 27, 1965, 3,477
5 Claims. (Cl. 126—271.2)

ABSTRACT OF THE DISCLOSURE

A snow-clearing vehicle carrying a turbojet fitted horizontally and discharging hot gases toward the front of the vehicle and into a chamber from which are branched discharge ducts ending with apertures which are positioned near the ground and which are provided with deflector flaps pivotable about a horizontal axis and controllable by means of double-acting jacks.

Cross-references to related applications

This is a divisional application of our patent application Ser. No. 498,453, filed Oct. 20, 1965, now Patent No. 3,308,806.

Background of the invention

The present invention relates to the clearing of areas covered with ice or snow, such as roads or runways, by means of vehicles specially equipped for this purpose.

Bertin et al. No. 3,199,506, describe an apparatus which is mounted on the front of a vehicle and which comprises two curved ducts supplied by a turbojet with hot gases, the duct discharge orifices being near the ground and slightly staggered in the longitudinal direction which is the direction of vehicle movement, the axes of such orifices extending substantially horizontally and transversely, the orifices having provision for deflecting the jet stream.

With a turbojet developing from 2800 to 3000 kg.-weight of static thrust, this apparatus has shown itself capable of removing nearly all the glazed frost in a single pass over a width of about 25 metres—i.e., 12 to 13 metres beyond the discharge orifice of each curved duct. A track covered just by snow is cleaned over an even greater width in a single pass.

Summary of the invention

Experiments have shown that the deflecting system in the discharge orifices should preferably be restricted to act in the vertical direction. A number of deflector vanes immersed in the hot stream issuing from an orifice, the deflector vanes being made of a heat-resistant material and each being pivotable around a horizontal pivot by a control jack, form a simple and effective embodiment of a mechanical deflecting system of this kind.

Furthermore the turbojet exhaust pipe extending substantially horizontally towards the vehicle front branches into two curved ducts as well as a pair of straight auxiliary discharge ducts disposed completely or substantially transversely slightly behind the curved ducts. The orifices of the auxiliary ducts are near the ground and the hot streams at high speed issuing from them prolong the action of the streams delivered by the curved ducts.

The orifices of the curved ducts and the orifices of the straight auxiliary ducts each have stream-deflecting vanes disposed on horizontal pivots and operated by a double-acting jack.

Brief description of the drawing

FIGURE 2 is a plan view corresponding to FIGURE 1, with partial sectioning to show the left-hand auxiliary duct in the folded position, and FIGURE 3 diagrammatically shows means for supporting the end of an auxiliary duct in the folded position.

Description of the preferred embodiment

Figure 1:
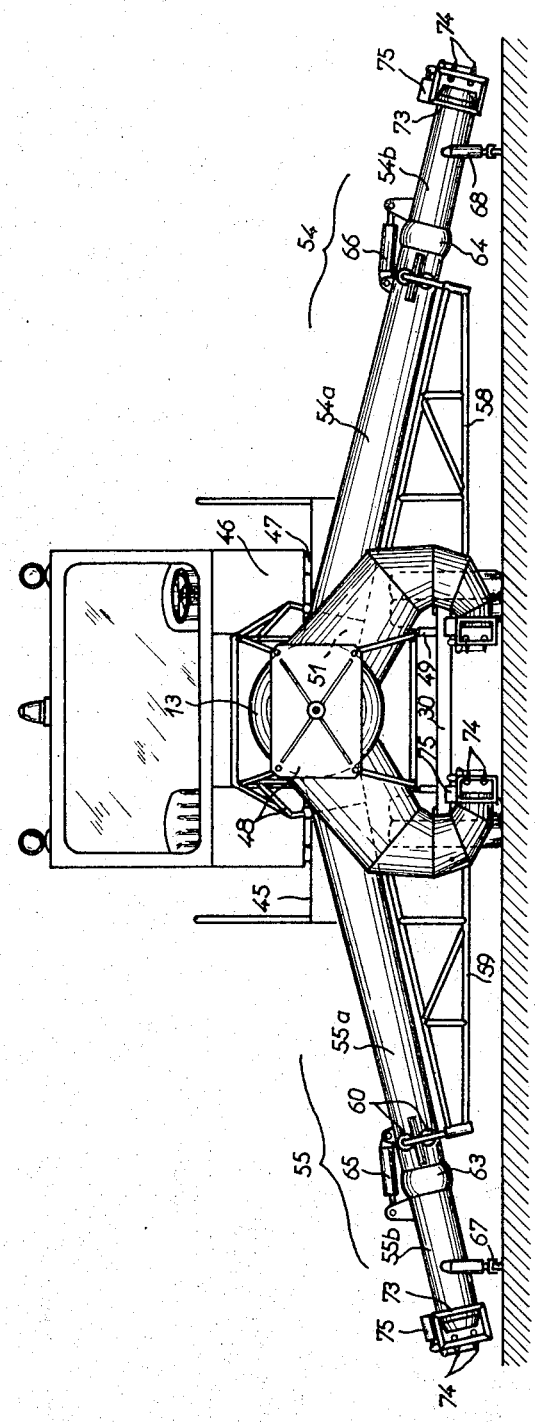
FIGURE 1 is an end elevation of a track-clearing vehicle according to the invention, the auxiliary ducts being shown in the operative position.

The carrier vehicle, which can be of substantially conventional construction, has as its main items a frame 30 on which a turbojet 10 and, disposed therearound, a platform 45 are mounted. A control cab 46 is disposed above and to the front of the platform 45 and is connected thereto by some known form of resilient suspension 47. The turbojet 10 includes an air intake 10a opening towards the rear of the vehicle, an air compressor, combustion chambers and a gas turbine for driving the air compressor. The exhaust gases issuing from the turbine are collected in a tubular chamber 13 extending the turbojet towards the front of the vehicle. The common axis of the turbojet and of the tubular chamber 13 is substantially horizontal. The cab 46 straddles the chamber 13 and contains seats for the vehicle driver and for the operator of the heat cleaning apparatus according to this invention. No further details of the carrier vehicle will be given and it will be assumed to have in conventional manner rear driving wheels driven by a motor suspended below the frame 30 and front steerable wheels.

The tubular chamber 13 and the turbojet 10 are mounted in a cradle 48. The same is borne by the frame by a horizontal pivot 50 at the rear and at the front by jacks 49 adapted to rotate the cradle around the pivots in a vertical plane. As in the aforesaid Patent 3,199,506, the chamber 13 bears two curved ducts 14 and 15 whose discharge orifices are near the ground and extend transversely and are staggered in the longitudinal direction corresponding to the direction of vehicle movement. Consequently, varying the length of the jacks 49 varies the above-ground height of the latter orifices.

Behind the curved ducts the chamber 13 has two transverse and oppositely disposed spigots 51 which are connected to straight auxiliary ducts 54 and 55. Each auxiliary duct is connected by means of an articulation 52 and 53 whose axis is substantially vertical and which is, with advantage, borne by the cradle 48. Preferably, a mechanical lock means 56 and 57 is disposed opposite each articulation 52 and 53 in front of a connection 51.

The ducts 54 and 55, like the curved ducts 14 and 15, have a convergent form in the direction of flow of the hot gases issuing from the chamber 13 so as to expand said gases and to form gaseous jets at high kinetic and thermal energy.

The cradle 48 also bears two arms 58 and 59 each articulated around a vertical hinge which, with advantage, coincides with the corresponding pivot spindle 52 and 53 and which serves to bear a duct 54 and 55. Rollers 60 are disposed at the end of each arm 58 and 59 and are preferably mounted on a fork having a vertical pivot. The rollers co-operate with a double ramp of a first portion 54a and 55a of the ducts 54 and 55 so as to bear the same while allowing them free heat expansion movements. A stay 61 and 62 can be used to increase the horizontal rigidity of each of the systems formed by an auxiliary duct and its support arm.

A toggle joint 63 and 64 or some similar form of joint adapted to pivot around a horizontal spindle is disposed at the end of the first portion 54a and 55a of such a duct. The toggle joint acts as an articulation for an end portion 54b and 55b of each straight auxiliary duct. The end portion, being pivotable by a jack 65 and 66 in a substantially vertical plane and under the control of a feeler 67 and 68 borne by each end portion 54b and 55b, will ensure that the orifice of an auxiliary discharge duct 54 and 55 is maintained at a constant height above ground level. The feeler can take the form, for instance, of a roller mounted on the end of a distributor valve through which the corresponding jack 65 and 66 is supplied.

When a duct of this kind is folded (e.g. 54 in FIGURES 2 and 3), its end portion 54b rests on a support rigidly connected to the carrier vehicle frame 30 and comprising, for instance, a stationary jaw 69 having bearing fuse 69a, and a jaw 70 movable around a spindle 71, the system being readily lockable by a pin 72. With the two auxiliary ducts folded, the vehicle has a reduced width possibly less than the railway loading gauge.

The orifices of the ducts 14, 15, 54 and 55 all have a frame 73 bearing a number of deflector vanes 74 mounted on horizontal pivots and operated by a double-acting control jack 75. The deflector vanes 74 and, if necessary, the frames 73 are of course made of a heat-resistant material.

Closure members can of course be provided on the nozzle spigots 51 so that only the curved ducts 14 and 15 are used, as in the aforesaid United States patent specification 3,199,506. The jacks 49 control the ground clearance of the auxiliary duct discharge orifices and the jacks 75 control the spread and range of each gas stream.

Using the ducts 54 and 55 considerably increases the width which the gas streams can sweep effectively. With a turbojet of 2800–3000 kg. thrust weight, the width may be as much as 45 metres, or sufficient to thaw out in a single pass a width sufficient for the landing of a heavy aircraft. In this case the total width of the apparatus is some 14 metres, but with the ducts 54 and 55 folded the vehicle can be transported by rail without dismantling. The hot streams of gas issuing from the auxiliary ducts speed up at least some of the gases delivered by the curved ducts.

The scope of this invention will not of course be exceeded if equivalent means are used instead of the embodiments hereinbefore described; inter alia, instead of the mechanical deflecting systems in the duct orifices, a pneumatic system associated with two deflecting directions, of the kind described in the aforesaid United States patent specification 3,199,506, can be used, and the carrier vehicle can have a grid disposed in front of the curved ducts 14 and 15, as shown by chain lines 30a, to break up the snow and remove heavy parts, such as stones, which cannot be removed by blowing. Also, the support arms 58 and 59 can have the shape of a hollow triangular beam extending around a duct portion 54a and 55a. Such portion can have a sliding joint so as to vary the spacing of the discharge orifices of the auxiliary ducts 54 and 55. Each end portion can be borne by a wheel and not have a feeler-operated jack.

We claim:
1. An apparatus for cleaning wide tracks covered with snow or glazed frost and comprising: a carrier vehicle, a turbojet arranged on said vehicle with its exhaust facing the vehicle front, the axis of said turbojet being substantially horizontal, a chamber connected to the exhaust of said turbojet for collecting the hot gases issuing therefrom, a pair of curved main discharge ducts connected to said chamber and ending with transverse discharge apertures positioned near the ground and slightly staggered in the longitudinal direction which is the direction of vehicle movement, a pair of straight auxiliary discharge ducts also connected to said chamber and ending with discharge apertures positioned near the ground, said straight discharge ducts being disposed in a substantially transverse direction and slightly behind the curved ducts, wherein the improvement comprises a controllable stream-deflecting device comprising a plurality of deflector vanes each pivotable about a substantially horizontal axis extending substantially in said longitudinal direction and fitted at the discharge apertures of at least one of said pairs of discharge ducts to be immersed within the stream issuing therefrom, and a double-acting jack for controlling in operation the angular setting of said deflector vanes.

2. Apparatus as claimed in claim 1, wherein the horizontally pivoted vanes are fitted at the discharge apertures of the curved main discharge ducts.

3. Apparatus as claimed in claim 1, wherein the horizontally pivoted vanes are fitted at the discharge apertures of the straight auxiliary discharge ducts.

4. Apparatus as claimed in claim 1, wherein the horizontally pivoted vanes are fitted at the discharge apertures of both the pairs of discharge ducts.

5. Apparatus as claimed in claim 1, wherein the discharge apertures of the discharge ducts are substantially circular and the pivotable vanes extend substantially chordwise with respect thereto.

References Cited

UNITED STATES PATENTS

| | | |
|---|---|---|
| 3,041,748 | 7/1962 | Wetzel. |
| 3,136,488 | 6/1964 | Petlak et al. |
| 3,174,477 | 3/1965 | Wilson _ _ _ _ _ _ _ _ _ _ _ 126—271.2 |
| 3,199,506 | 8/1965 | Bertain et al. _ _ _ _ _ _ 126—271.2 |
| 3,228,125 | 1/1966 | Wiebe. |
| 3,308,806 | 3/1967 | Bertain et al. _ _ _ _ _ _ 126—271.2 |

FOREIGN PATENTS 1,191,114   4/1959   France.

CHARLES J. MYHRE, *Primary Examiner.*